United States Patent
Ishino et al.

(10) Patent No.: US 9,954,453 B1
(45) Date of Patent: Apr. 24, 2018

(54) SWITCHING POWER SUPPLY DEVICE AND SWITCHING CONTROL CIRCUIT

(71) Applicant: TDK CORPORATION, Tokyo (JP)

(72) Inventors: Yusuke Ishino, Tokyo (JP); Kengo Tsujimoto, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 15/634,200

(22) Filed: Jun. 27, 2017

(51) Int. Cl.
*H02M 3/335* (2006.01)
*H02M 1/08* (2006.01)

(52) U.S. Cl.
CPC ......... *H02M 3/33569* (2013.01); *H02M 1/08* (2013.01)

(58) Field of Classification Search
USPC ....... 363/17, 56.02, 78, 95, 97, 98, 131, 132
See application file for complete search history.

(56) References Cited

U.S. PATENT DOCUMENTS

| | | | | |
|---|---|---|---|---|
| 9,093,908 | B2 * | 7/2015 | Takegami | H02M 3/33507 |
| 9,252,654 | B1 * | 2/2016 | Tomioka | H02M 1/4225 |
| 9,252,666 | B2 * | 2/2016 | Sakita | H02J 7/022 |
| 9,768,699 | B2 * | 9/2017 | Nakahori | H02M 1/08 |
| 9,787,197 | B2 * | 10/2017 | Nakahori | H02M 3/33507 |
| 9,831,790 | B2 * | 11/2017 | Mizushima | H02M 3/3376 |
| 9,859,799 | B2 * | 1/2018 | Nakahori | H02M 3/33507 |
| 2014/0241018 | A1 | 8/2014 | Hwang et al. | |
| 2016/0301320 | A1 * | 10/2016 | Wakabayashi | H02M 3/33569 |
| 2017/0077819 | A1 | 3/2017 | Andres | |

FOREIGN PATENT DOCUMENTS

JP    2002-305873 A    10/2002

OTHER PUBLICATIONS

Sep. 1, 2017 Search Report issued in European Patent Application No. 17179077.7.
Japanese Patent Application No. 2016-082161 filed Apr. 15, 2016.

* cited by examiner

*Primary Examiner* — Adolf Berhane
(74) *Attorney, Agent, or Firm* — Oliff PLC

(57) ABSTRACT

A switching power supply device includes a switching power supply circuit and a control circuit. The switching power supply circuit includes a transformer having a primary winding and a secondary winding, a switching circuit coupled to the primary winding, and a conversion circuit that is coupled to the secondary winding and converts an alternating current voltage outputted from the secondary winding into a direct current voltage. The control circuit determines a maximum load current value on a basis of a duty ratio in the conversion circuit and the direct current voltage, and controls, on a basis of the maximum load current value, an operation of the switching circuit to cause the switching power supply circuit to perform a predetermined voltage reduction operation. The maximum load current value indicates a maximum value of a load current that allows the conversion circuit to output a predetermined voltage.

7 Claims, 8 Drawing Sheets

| Vout  DR | 9V | 11V | 13V | 15V | 17V |
|---|---|---|---|---|---|
| 100% | 1020 | 1060 | 1100 | 1050 | 900 |
| 90% | 920 | 960 | 1000 | 950 | 850 |
| 80% | 820 | 860 | 900 | 850 | 800 |
| 70% | 720 | 760 | 800 | 750 | 750 |
| 60% | 620 | 660 | 700 | 650 | 700 |
| 50% | 520 | 560 | 600 | 550 | 650 |
| 40% | 420 | 460 | 500 | 450 | 600 |
| 30% | 320 | 360 | 400 | 350 | 550 |
| 20% | 220 | 260 | 300 | 250 | 500 |
| 10% | 120 | 160 | 200 | 150 | 450 |

SWITCHING POWER SUPPLY DEVICE AND SWITCHING CONTROL CIRCUIT

BACKGROUND

The disclosure relates to a switching power supply device that performs voltage conversion by using switching elements and to a switching control circuit to be provided in such a switching power supply device.

Power supply devices are sometimes controlled such that their output voltage is reduced when their load current excessively increases. This control enables power supply devices and devices that serve as their loads to be kept in a safe state. As an example, Japanese Unexamined Patent Application Publication No. 2002-305873 discloses a switching power supply device that detects an excessive increase in a load current on the basis of an input voltage, an output voltage, and a duty ratio.

SUMMARY

In general, there is a demand for electronic apparatuses to have simple configurations. Therefore, switching power supply devices are also expected to have simple configurations.

It is desirable to provide a switching power supply device and a switching control circuit that have simple configurations.

A switching power supply device according to an embodiment of the disclosure includes: a switching power supply circuit that includes a transformer, a switching circuit, and a conversion circuit, in which the transformer has a primary winding and a secondary winding, the switching circuit is coupled to the primary winding, the conversion circuit is coupled to the secondary winding and converts an alternating current voltage outputted from the secondary winding into a direct current voltage; and a control circuit that determines a maximum load current value on a basis of a duty ratio in the conversion circuit and the direct current voltage, and controls, on a basis of the maximum load current value, an operation of the switching circuit to cause the switching power supply circuit to perform a predetermined voltage reduction operation. The maximum load current value indicates a maximum value of a load current that allows the conversion circuit to output a predetermined voltage.

A switching control circuit according to an embodiment of the disclosure includes circuitry that: determines a maximum load current value on a basis of a duty ratio in a conversion circuit provided in a switching power supply circuit and a direct current voltage into which the conversion circuit converts an alternating current voltage, in which the maximum load current value indicates a maximum value of a load current that allows the conversion circuit to output a predetermined voltage; and controls, on a basis of the maximum load current value, an operation of the switching power supply circuit to cause the switching power supply circuit to perform a predetermined voltage reduction operation.

BRIEF DESCRIPTION OF THE DRAWINGS

FIG. 2 is a table illustrating an example of a configuration of a look-up table (LUT) illustrated in FIG. 1.

DETAILED DESCRIPTION

Some embodiments of the disclosure will be described below in detail with reference to the accompanying drawings.

Configuration Example

Figure 1:
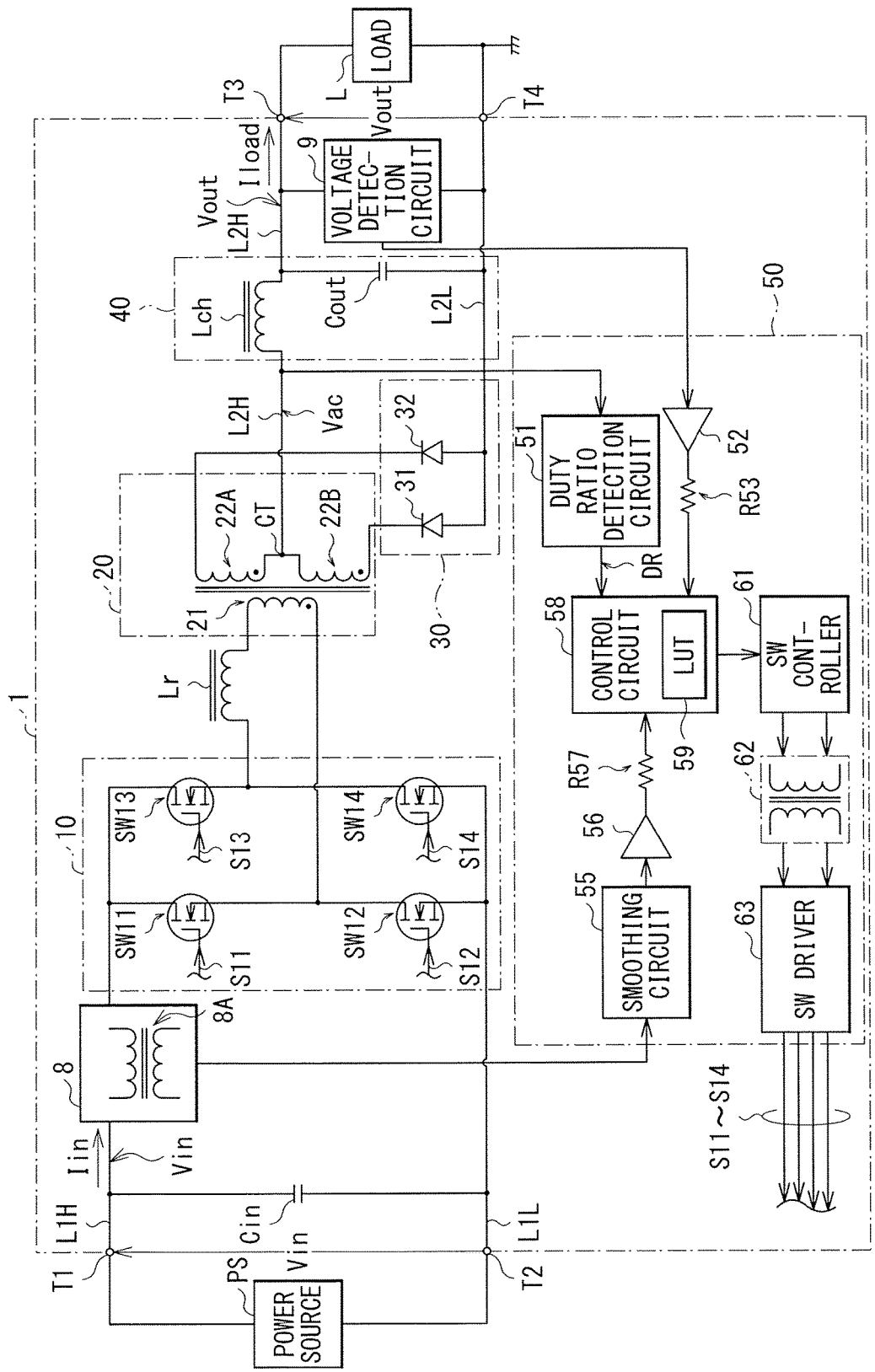
FIG. 1 is a circuit diagram illustrating an example of a configuration of a switching power supply device according to an embodiment of the disclosure.

FIG. 1 is a circuit diagram illustrating an example of a configuration of a switching power supply device according to an embodiment of the disclosure, which corresponds to a switching power supply device 1. A switching control circuit according to an embodiment of the disclosure will also be embodied by this embodiment, and thus will be described together.

In this example, the switching power supply device 1 may be supplied with a DC (direct current) input voltage Vin from a power source PS coupled to input terminals T1 and T2, and may perform voltage conversion of the input voltage Vin, more specifically, may reduce the input voltage Vin. As a result of this voltage conversion, the switching power supply device 1 may generate a DC output voltage Vout and supplies this output voltage Vout to a load L through output terminals T3 and T4. The switching power supply device 1 may include an input smoothing capacitor Cin, a current detection circuit 8, a switching circuit 10, a transformer 20, a rectifier circuit 30, a smoothing circuit 40, a voltage detection circuit 9, and a controller 50.

The input smoothing capacitor Cin may be disposed between a primary high-voltage line L1H coupled to the input terminal T1 and a primary low-voltage line L1L coupled to the input terminal T2. The input smoothing capacitor Cin may smooth the DC input voltage Vin that has been supplied from the power source PS to the input terminals T1 and T2.

The current detection circuit 8 may be disposed on the primary high-voltage line L1H and between the input terminal T1 and the switching circuit 10. The current detection circuit 8 may detect an input current Iin flowing along the primary high-voltage line L1H and may supply a detected signal associated with this detected input current Iin to the controller 50. In this example, the current detection circuit 8 may include a current transformer 8A.

The switching circuit 10 may be a full-bridge switching circuit that converts the input voltage Vin into an AC (alternating current) voltage. The switching circuit 10 may include switching elements SW11 to SW14.

Each of the switching elements SW11 to SW14 may be, for example, a MOS-FET (metal oxide semiconductor-field effect transistor), an IGBT (insulated gate bipolar transistor), or some other power element. In this example, each of the switching elements SW11 to SW14 may be an N-channel MOS-FET. A gate of the switching element SW11 may be supplied with an SW control signal S11, a source of the switching element SW11 may be coupled to a drain of the switching element SW12, and a drain of the switching element SW11 may be coupled to the primary high-voltage line L1H. A gate of the switching element SW12 may be supplied with an SW control signal S12, a source of the switching element SW12 may be coupled to the primary low-voltage line L1L, and the drain of the switching element SW12 may be coupled to the source of the switching element SW11. A gate of the switching element SW13 may be supplied with an SW control signal S13, a source of the switching element SW13 may be coupled to a drain of the switching element SW14, and a drain of the switching element SW13 may be coupled to the primary high-voltage line L1H. A gate of the switching element SW14 may be supplied with an SW control signal S14, a source of the switching element SW14 may be coupled to the primary low-voltage line L1L, and the drain of the switching element SW14 may be coupled to the source of the switching element SW13. Furthermore, both the source of the switching element SW11 and the drain of the switching element SW12 may be coupled to a first end of a primary winding 21 in the transformer 20. Details of the primary winding 21 will be described later. Both the source of the switching element SW13 and the drain of the switching element SW14 may be coupled to a second end of the later-described primary winding 21 via a resonance inductor Lr. The resonance inductor Lr may constitute a predetermined LC resonance circuit together with parasitic capacitative elements in the switching elements SW11 to SW14 and a leakage inductor in the transformer 20.

With this configuration, the switching circuit 10 may control the turn-on/turn-off of the switching elements SW11 to SW14 in accordance with the SW control signals S11 to S14 supplied from the controller 50, thereby converting the DC input voltage Vin into the AC voltage.

In the transformer 20, the primary side and the secondary side may be DC-isolated from each other but AC-coupled to each other. The transformer 20 may be a three-winding transformer that includes the primary winding 21 and secondary windings 22A and 22B. The primary winding 21 in the transformer 20 may make a forward connection with the secondary windings 22A and 22B. The first end of the primary winding 21 may be coupled to the switching circuit 10, whereas the second end of the primary winding 21 may be coupled to the switching circuit 10 via the resonance inductor Lr. Both a first end of the secondary winding 22A and a first end of the secondary winding 22B may be coupled to the rectifier circuit 30. A second end of the secondary windings 22A and a second end of the secondary winding 22B may be coupled to each other at a center tap CT and also coupled to a secondary high-voltage line L2H. The number of turns in the primary winding 21 is denoted by Np, and the number of turns in each of the secondary windings 22A and 22B is denoted by Ns. The ratio of the numbers of turns Np to the numbers of turns Ns may be set to 10:1, for example.

With this configuration, the transformer 20 may reduce the AC voltage supplied across the primary winding 21 by about "Ns/Np" times and may output the reduced voltage from the secondary windings 22A and 22B.

The rectifier circuit 30 may be a circuit that rectifies the AC voltage supplied from the transformer 20. The rectifier circuit 30 may include diodes 31 and 32. The diode 31 may have a cathode coupled to the first end of the secondary winding 22B and an anode coupled to the secondary low-voltage line L2L. The diode 32 may have a cathode coupled to the first end of the secondary winding 22A and an anode coupled to the secondary low-voltage line L2L.

The smoothing circuit 40 may include a choke coil Lch and an output smoothing capacitor Cout. The choke coil Lch may be inserted into and disposed on the secondary high-voltage line L2H with its first end coupled to the center tap CT of the transformer 20 and its second end coupled to the output terminal T3. The output smoothing capacitor Cout may be disposed between the second end of the choke coil Lch and the secondary low-voltage line L2L.

With this configuration, the smoothing circuit 40 may smooth an alternating current signal, which is referred to below as an AC voltage Vac, that the rectifier circuit 30 has rectified and output from the center tap CT, thereby generating the DC output voltage Vout. Thereafter, the smoothing circuit 40 may supply the output voltage Vout to the load L coupled between the output terminals T3 and T4.

The voltage detection circuit 9 may be disposed between the secondary high-voltage line L2H and the secondary low-voltage line L2L. The voltage detection circuit 9 may detect the output voltage Vout between the output terminals T3 and T4 and may supply a detected signal associated with the detected output voltage Vout to the controller 50. The voltage detection circuit 9 may divide the output voltage Vout, and may output the divided voltage. For example, the voltage detection circuit 9 may divide the output voltage Vout by using a resistance circuit having a predetermined voltage dividing ratio.

The controller 50 may control a switching operation of the switching circuit 10 on the basis of the input current Iin detected by the current detection circuit 8, the output voltage Vout detected by the voltage detection circuit 9, and the AC voltage Vac at the center tap CT. The controller 50 may include a duty ratio detection circuit 51, a buffer 52, a resistor R53, a smoothing circuit 55, a buffer 56, a resistor R57, a control circuit 58, an SW controller 61, a transformer 62, and an SW driver 63.

The duty ratio detection circuit 51 may be a circuit that detects a duty ratio DR on the basis of the AC voltage Vac at the center tap CT. The duty ratio detection circuit 51 may employ any configuration that makes it possible to detect the duty ratio DR. More specifically, for example, the duty ratio detection circuit 51 may generate a signal by varying the peak-to-peak value of the AC voltage Vac so as to coincide with a predetermined peak-to-peak value and detect the average of this signal, on the basis of the AC voltage Vac, thereby detecting the duty ratio DR.

The buffer 52 may be a circuit that has an impedance conversion function and, for example, varies a voltage range of the signal supplied from the voltage detection circuit 9 and outputs this signal. The resistor R53 may have a function of removing noise from a signal output from the buffer 52 and/or a function of protecting the buffer 52 and the control circuit 58 by suppressing surge voltage or overcurrent, for example.

The smoothing circuit 55 may be a circuit that converts the detected signal supplied from the current detection circuit 8 into a voltage and thereafter smoothes this voltage. The buffer 56 may be a circuit that has an impedance conversion function and, for example, varies a voltage range of the signal supplied from the smoothing circuit 55 and outputs this signal. The resistor R57 may have, similar to the resistor R53, a function of removing noise from a signal output from the buffer 56 and/or a function of protecting the buffer 56 and the control circuit 58 by suppressing surge voltage or overcurrent, for example. With this configuration, the control circuit 58 may be supplied with an average value of the input current Iin. This average value is referred to below as an average input current Iindc.

The control circuit 58 may be implemented using an MCU (micro controller unit), for example. The control circuit 58 may control an operation of the switching circuit 10 by supplying a control signal to the SW controller 61, on the basis of the output voltage Vout, the duty ratio DR, and the average input current Iindc. More specifically, when a load current Iload in the switching power supply device 1 is lower than a maximum load current Ilimit, the control circuit 58 may control an operation of the switching circuit 10 so that the output voltage Vout becomes constant. However, when the load current Iload in the switching power supply device 1 is equal to or higher than the maximum load current Ilimit, the control circuit 58 may control an operation of the switching circuit 10 so that the output voltage Vout is reduced with the output power (=Vout×Iload) kept constant. The control circuit 58 may have an LUT (look-up table) 59. The LUT 59 may represent the correspondence relationship of the output voltage Vout and the duty ratio DR versus the maximum load current Ilimit.

FIG. 2 is a table illustrating an example of the LUT 59. FIG. 2 lists values of the maximum load current Ilimit in any unit which are related to values of the output voltage Vout illustrated in a horizontal direction and values of the duty ratio DR illustrated in a vertical direction.

While the switching power supply device 1 is in operation, the control circuit 58 may repeat the monitor of the output voltage Vout, the duty ratio DR, and the average input current Iindc. For example, the control circuit 58 may repeat the monitor at preset intervals such as 1 msec. Thereafter, the control circuit 58 may repeat the determination of the load current Iload on the basis of the output voltage Vout, the duty ratio DR, and the average input current Iindc. In this case, first, the input voltage Vin may be determined using the output voltage Vout and the duty ratio DR, as indicated by the following expression EQ1:

$$Vin = Vout \times N/DR \quad (EQ1),$$

where N denotes the turns ratio (Ns/Np) of the transformer 20. The load current Iload may then be determined using the input voltage Vin, the average input current Iindc, and the output voltage Vout, as indicated by the following expression EQ2:

$$Iload = Vin \times Iindc \times n/Vout \quad (EQ2),$$

where n denotes a conversion efficiency of the switching power supply device 1.

The control circuit 58 may repeat the determination of the maximum load current Ilimit by using the LUT 59 illustrated in FIG. 2 and on the basis of the output voltage Vout and the duty ratio DR. In this case, the control circuit 58 may perform an interpolation process by using the LUT 59, thereby making it possible to determine the maximum load current Ilimit on the basis of the output voltage Vout and the duty ratio DR with great precision.

When the load current Iload determined by both the expressions EQ1 and EQ2 is equal to or higher than the maximum load current limit, the control circuit 58 may reduce the output voltage Vout by using the LUT 59.

The SW controller 61 may control the SW driver 63 on the basis of a control signal supplied from the control circuit 58. More specifically, the SW controller 61 may generate a control signal, which will be a source of the SW control signals S11 to S14 and thereafter may supply this control signal to the SW driver 63 via the transformer 62. The SW driver 63 may thereafter generate the SW control signals S11 to S14 on the basis of the control signal supplied from the SW controller 61 via the transformer 62. The SW driver 63 may supply the signals S11 to S14 to the switching elements SW11 to SW14, respectively, in the switching circuit 10.

Herein, the transformer 20 corresponds to a "transformer" in one specific but non-limiting embodiment of the disclosure. The switching circuit 10 corresponds to a "switching circuit" in one specific but non-limiting embodiment of the disclosure. The combination of the rectifier circuit 30 and the smoothing circuit 40 corresponds to a "conversion circuit" in one specific but non-limiting embodiment of the disclosure. The control circuit 58 corresponds to a "control circuit" in one specific but non-limiting embodiment of the disclosure. The duty ratio detection circuit 51 corresponds to a "detection circuit" in one specific but non-limiting embodiment of the disclosure. The LUT 59 corresponds to a "table" in one specific but non-limiting embodiment of the disclosure.

[Operation and Workings]

Next, a description will be given of an operation and workings of the switching power supply device 1 in this embodiment.

(Outline of Overall Operation)

First, an operation of the switching power supply device 1 will be described with reference to FIG. 1. The switching circuit 10 may turn on/off the switching elements SW11 to SW14 on the basis of the SW control signals S11 to S14. This may convert the DC input voltage Vin supplied from the power source PS into the AC voltage and supply this AC voltage across both ends of the primary winding 21 in the transformer 20. Thereafter, the transformer 20 may vary, more specifically, reduce the AC voltage by about Ns/Np times and output the thus-varied AC voltage from the secondary windings 22A and 22B. The rectifier circuit 30 may rectify the varied AC voltage. The smoothing circuit 40 may smooth the rectified signal, generating the DC output voltage Vout. Thereafter, the smoothing circuit 40 may supply the DC output voltage Vout across the load L coupled to the output terminals T3 and T4.

In the controller 50, the duty ratio detection circuit 51 may detect the duty ratio DR on the basis of the AC voltage Vac. Thereafter, the control circuit 58 may control an operation of the switching circuit 10 on the basis of the output voltage Vout, the duty ratio DR, and the average input current Iindc. More specifically, the control circuit 58 may repeat the determination of the load current Iload on the basis of the output voltage Vout, the duty ratio DR, and the average input current Iindc. Thereafter, the control circuit 58 may repeat the determination of the maximum load current limit by using the LUT 59 and on the basis of the output voltage Vout and the duty ratio DR. When the load current Iload in the switching power supply device 1 is lower than the maximum load current Ilimit, the control circuit 58 may control an operation of the switching circuit 10 so that the output voltage Vout becomes constant. When the load current Iload in the switching power supply device 1 is equal to or higher than the maximum load current Ilimit, the control circuit 58 may control an operation of the switching circuit 10 so that the output voltage Vout is reduced with the output power (=Vout×Iload) kept constant.

(Switching Operation)

Figure 3:
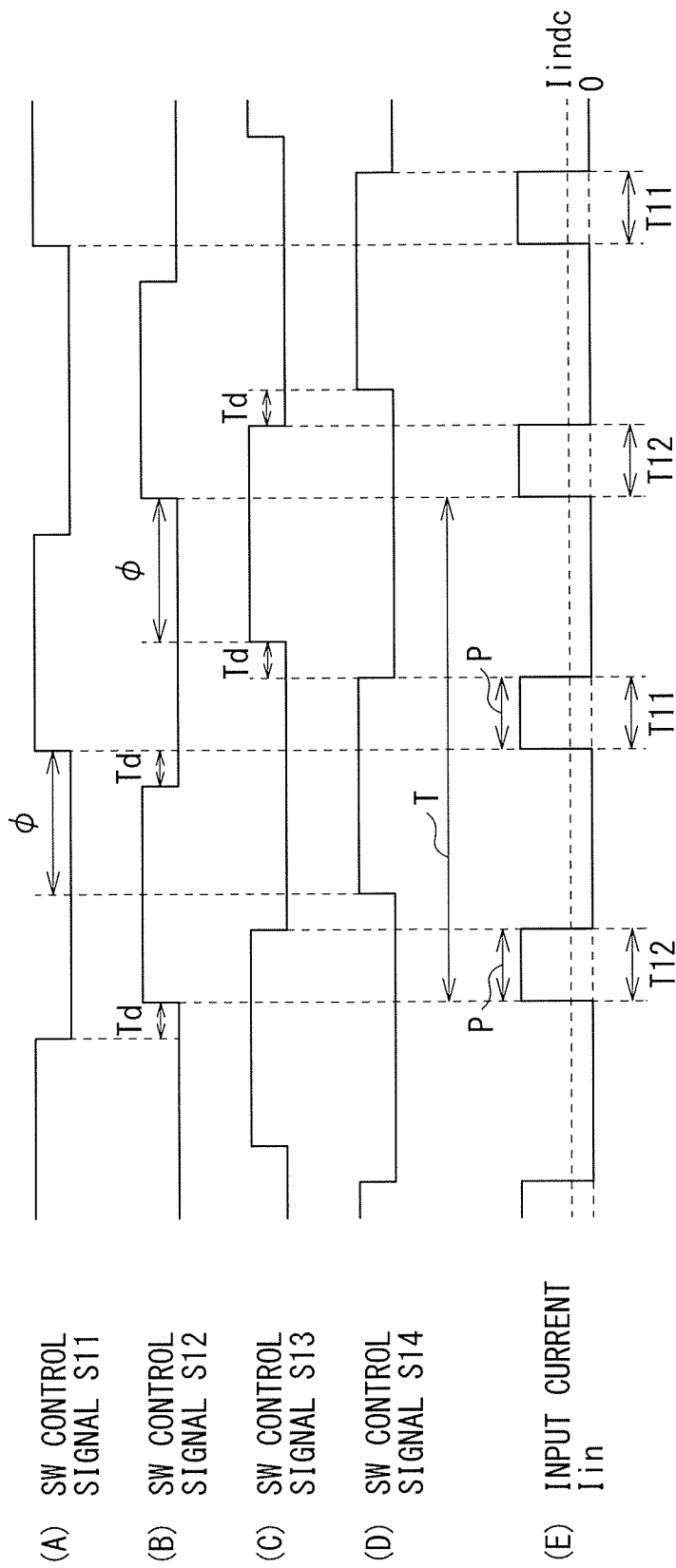
FIG. 3 is a waveform chart illustrating an example of an operation of the switching power supply device illustrated in FIG. 1.

FIG. 3 illustrates an operation of the switching power supply device 1. More specifically, Parts (A) to (D) of FIG. 3 illustrate waveforms of the SW control signals S11 to S14, respectively. In this example, when the SW control signals S11 to S14 of the high level are applied to the gates of the switching elements SW11 to SW14, respectively, the switching elements SW11 to SW14 are turned on. When the SW control signals S11 to S14 of the low level are applied to the gates of the switching elements SW11 to SW14, respectively, the switching elements SW11 to SW14 are turned off.

As illustrated in Parts (A) and (D) of FIG. 3, the SW driver 63 may generate the SW control signals S11 and S14 so as to have periods T11 over which both the SW control signals S11 and S14 are at the high level together. As a result, as illustrated in Part (E) of FIG. 3, the input current Iin may flow through the primary winding 21 in the transformer 20 over the periods T11, which are referred to as power transfer periods P. The power thereby may be transferred from the primary side to the secondary side of the transformer 20. Likewise, as illustrated in Parts (B) and (C) of FIG. 3, the SW driver 63 may generate the SW control signals S12 and S13 so as to have periods T12 over which both the SW control signals S12 and S13 are at the high level together. As a result, as illustrated in Part (E) of FIG. 3, the input current Iin may flow through the primary winding 21 in the transformer 20 over the periods T12, which are also referred to as the power transfer periods P. The power thereby may be transferred from the primary side to the secondary side of the transformer 20. In this case, the ratio of the total time (T11+T12) of the power transfer period P to the period T corresponds to the duty ratio DR.

As illustrated in Parts (A) and (B) of FIG. 3, the SW control signals S11 and S12 generated by the SW driver 63 are not at the high level together. Likewise, as illustrated in Parts (C) and (D) of FIG. 3, the SW control signals S13 and S14 generated by the SW driver 63 are not at the high level together. In other words, the switching elements SW11 and SW12 are not turned on together, and the switching elements SW13 and SW14 are not turned on together. In this way, the switching power supply device 1 prevents the primary high-voltage line L1H from being electrically shorted to the primary low-voltage line L1L. Furthermore, the SW control signals S11 and S12 may be set such that the period over which the SW control signal S11 is at the high level may be shifted from the period over which the SW control signal S12 is at the high level by a dead time Td. Likewise, the SW control signals S13 and S14 may be set such that the period over which the SW control signal S13 is at the high level may be shifted from the period over which the SW control signal S14 is at the high level by the dead time Td. This dead time Td is a time set to prevent the primary high-voltage line L1H from being electrically shorted to the primary low-voltage line L1L.

Figure 4:
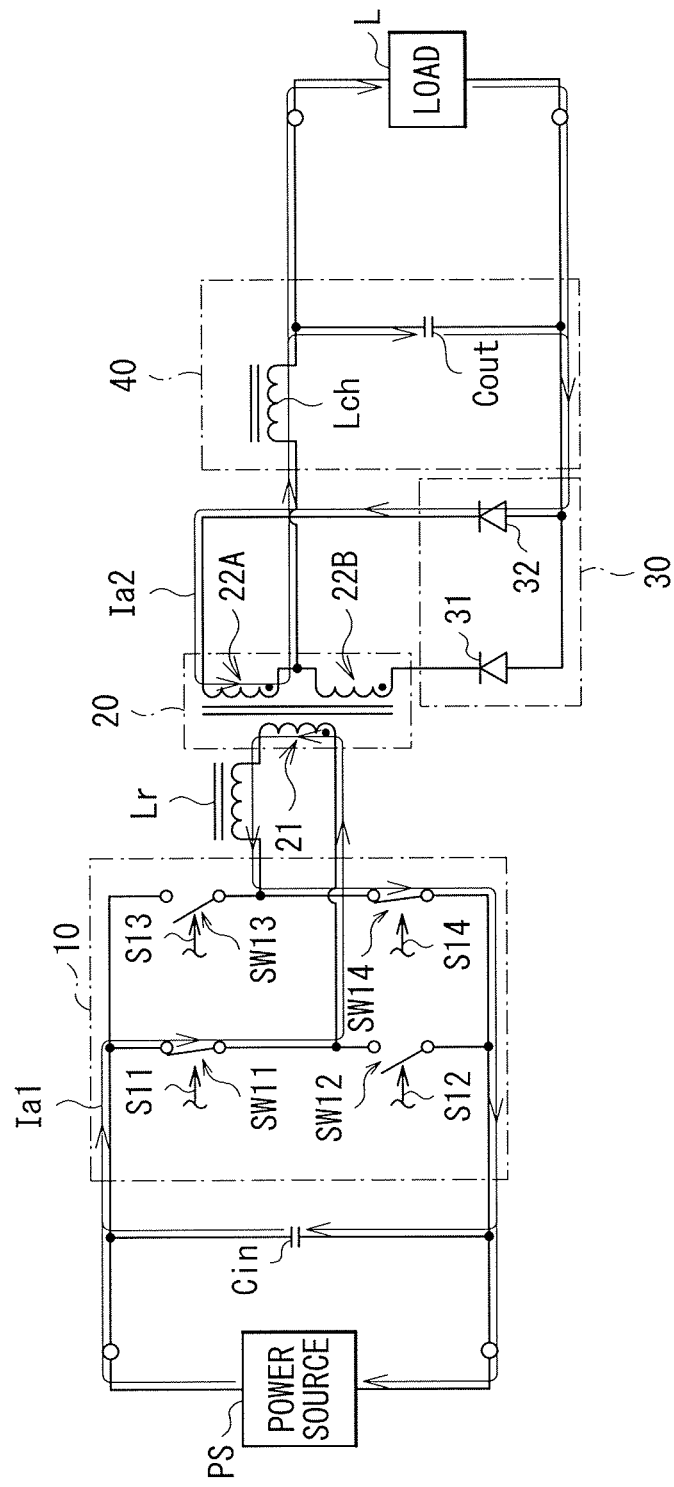
FIG. 4 describes an example of an operational state of the switching power supply device illustrated in FIG. 1.
Figure 5:
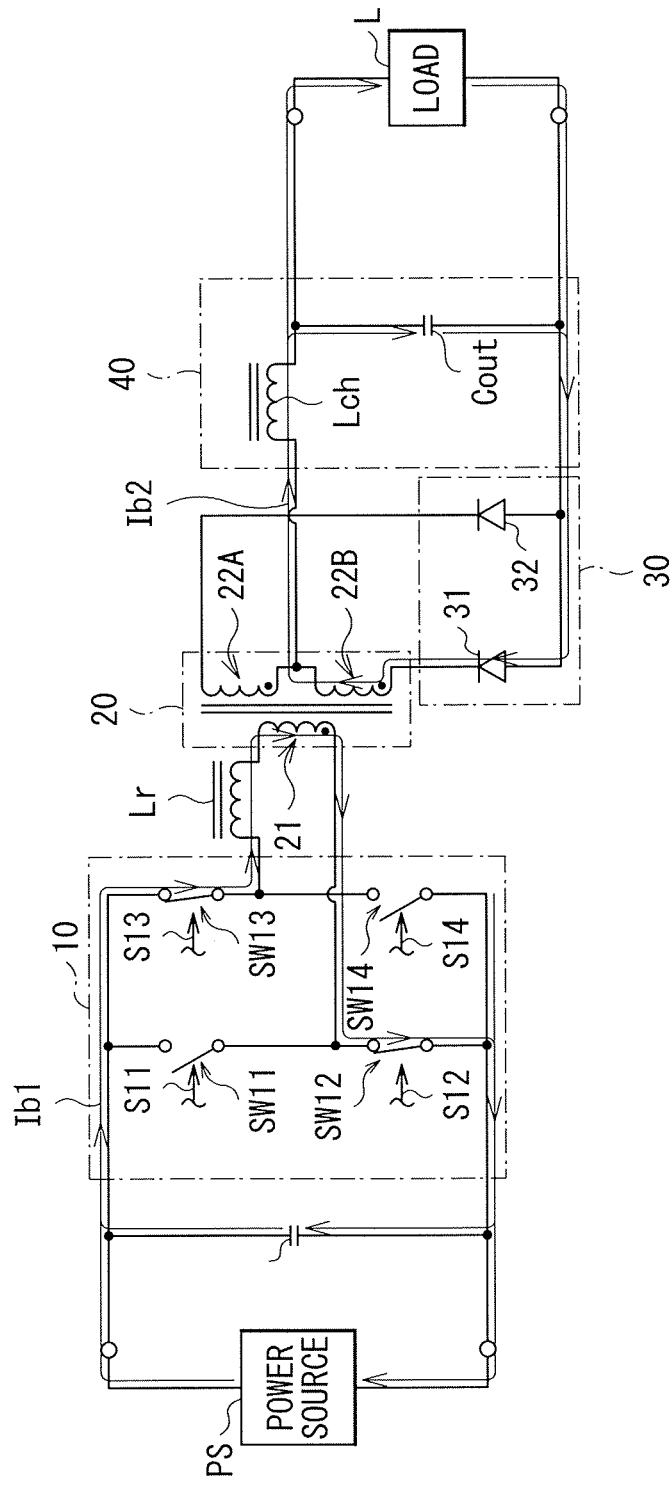
FIG. 5 describes an example of another operational state of the switching power supply device illustrated in FIG. 1.

FIGS. 4 and 5 each illustrate an operation of the switching power supply device 1. More specifically, FIG. 4 illustrates the operation of the switching power supply device 1 during the period T11, and FIG. 5 illustrates the operation of the switching power supply device 1 during the period T12. It is to be noted that in FIGS. 4 and 5, each of the switching elements SW11 to SW14 is illustrated as a switch representing its operational state, such as an ON or OFF state, in order to facilitate an understanding of the following description. In addition, some circuit blocks and elements that are not directly related to the description are not illustrated.

As illustrated in Parts (A) to (D) of FIG. 3, over the periods T11, the switching elements SW11 and SW14 in the switching circuit 10 may be in the ON state and the switching elements SW12 and SW13 may be in the OFF state. As illustrated in FIG. 4, the primary loop current Ia1 thereby may flow through, in this order, the switching element SW11, the primary winding 21 in the transformer 20, the resonance inductor Lr, the switching element SW14, and both the power source PS and the input smoothing capacitor Cin, on the primary side of the switching power supply device 1. Thereafter, the power may be transferred from the primary side to the secondary side of the transformer 20. The secondary loop current Ia2 thereby may flow, in this order, through the diode 32, the secondary winding 22A in the transformer 20, the choke coil Lch, and both the load L and the output smoothing capacitor Cout, on the secondary side of the switching power supply device 1.

As illustrated in Parts (A) to (D) of FIG. 3, over the periods T12, the switching elements SW12 and SW13 in the switching circuit 10 may be in the ON state and the switching elements SW11 and SW14 may be in the OFF state. As illustrated in FIG. 5, the primary loop current Ib1 may flow, in this order, through the switching element SW13, the resonance inductor Lr, the primary winding 21 in the transformer 20, the switching element SW12, and both the power source PS and the input smoothing capacitor Cin, on the primary side of the switching power supply device 1. Thereafter, the power may be transferred from the primary side to the secondary side of the transformer 20. The secondary loop current Ib2 thereby may flow, in this order, through the diode 31, the secondary winding 22B in the transformer 20, the choke coil Lch, and both the load L and the output smoothing capacitor Cout, on the secondary side of the switching power supply device 1.

In the switching power supply device 1, as described above, the power may be transferred from the primary side to the secondary side of the transformer 20 over the periods T11 and T12, namely, over the power transfer periods P. As a result, on the secondary side, the secondary loop current Ia2 may flow over the periods T11 and the secondary loop current Ib2 may flow over the periods T12. In this case, as illustrated in FIG. 3, the length of the periods T11 may be controlled by a phase difference y between the SW control signals S11 and S14, and the length of periods T12 may also be controlled by the phase difference φ between the SW control signals S12 and S13. For example, by decreasing the phase difference φ, the length of periods T11 and T12, namely, the length of the power transfer periods P may be prolonged. As a result, the duty ratio DR may increase, thereby lengthening the times over which secondary loop currents Ia2 and Ib2 flow. This may increase the generated output voltage Vout. In this way, the controller 50 may control the output voltage Vout by adjusting the phase difference φ.

(Voltage Reduction Operation)

While the switching power supply device 1 is in operation, the control circuit 58 in the controller 50 may repeat the monitor of the output voltage Vout, the duty ratio DR, and the average input current Iindc. For example, the control circuit 58 may repeat the monitor at preset intervals. Thereafter, the control circuit 58 may repeat the determination of the load current Iload on the basis of the output voltage Vout, the duty ratio DR, and the average input current Iindc, and may repeat the determination of the maximum load current Ilimit by using the LUT 59 and on the basis of the output voltage Vout and the duty ratio DR. When the load current Iload is equal to or higher than the maximum load current Ilimit, the control circuit 58 may reduce the output voltage Vout by using the LUT 59. Details of this operation will be described below.

Figure 6:
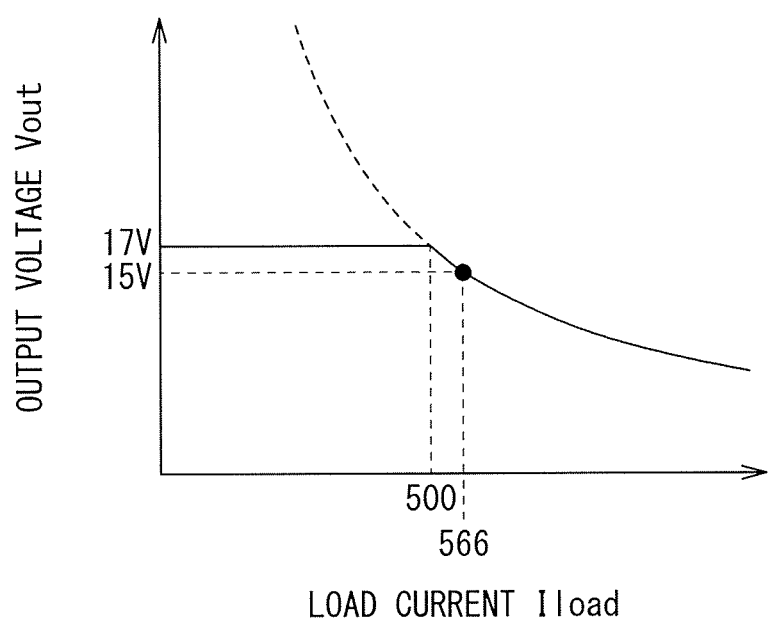
FIG. 6 describes an example of a voltage reduction operation of the switching power supply device illustrated in FIG. 1.

FIG. 6 illustrates an output voltage characteristic of the switching power supply device 1. In FIG. 6, the horizontal axis represents the load current Iload, and the vertical axis represents the output voltage Vout. In this example, when the load current Iload is lower than the maximum load current Ilimit, the switching power supply device 1 keeps the output voltage Vout at "17V".

In this example, when the load current Iload is sufficiently low, the control circuit 58 controls the operation of the switching circuit 10 so that the duty ratio DR becomes about "20%". The duty ratio detection circuit 51 may detect this duty ratio DR on the basis of the AC voltage Vac. Thereafter, the control circuit 58 may determine the maximum load current Ilimit by using the LUT 59 and on the basis of the output voltage Vout and the duty ratio DR. In this example, the output voltage Vout is about "17V", and the duty ratio DR is about "20%". Thus, the control circuit 58 may obtain "500" (a value in any unit) as a value of the maximum load current Ilimit by using the LUT 59 as illustrated in FIG. 2. In this example, the load current Iload is sufficiently lower than this maximum load current Ilimit. When the load current Iload is lower than the maximum load current Ilimit as in this example, the control circuit 58 may control the operation of the switching circuit 10 so that the output voltage Vout becomes constant.

When the load current Iload gradually increases and becomes equal to or more than the maximum load current Ilimit, for example, the control circuit 58 may control the operation of the switching circuit 10 so that the output voltage Vout is reduced with the output power (=Vout×Iload) kept constant. When the load current Iload becomes "566" (a value in any unit) as in the example of FIG. 6, for example, the control circuit 58 may control the operation of the switching circuit 10 so that the duty ratio DR becomes about "51%". As a result, the output voltage Vout becomes about "15V". In this case, the control circuit 58 may repeat the determination of the maximum load current Ilimit (overcurrent point) on the basis of the output voltage Vout and the duty ratio DR. When the load current Iload exceeds the maximum load current Ilimit, for example, the control circuit 58 may vary the maximum load current Ilimit to a larger value. By varying the maximum load current Ilimit in this manner, the control circuit 58 may control the operation of the switching circuit 10 so that the output voltage Vout is reduced with the output power (=Vout×Iload) kept constant. In this way, the switching power supply device 1 may adjust its power to be output.

As described above, the switching power supply device 1 controls the voltage reduction operation on the basis of the output voltage Vout and the duty ratio DR with the simple configuration. More specifically, for example, if a switching power supply device controls a voltage reduction operation so as to decrease variations in overcurrent points, on the basis of the input voltage Vin, some electrically isolation members, such as a transformer, are necessary to transfer information regarding the input voltage Vin to a control circuit. The increase in the number of components in this case may lead to an increase in cost, and mounting such electrically isolation members in the switching power supply device may enlarge the switching power supply device itself. In contrast, the switching power supply device 1 that controls the voltage reduction operation on the basis of the output voltage Vout and the duty ratio DR does not have to detect the input voltage Vin. Therefore, the switching power supply device 1 does not have to be provided with any electrical isolation members as described above, thereby achieving a simple configuration. Consequently, it is possible to provide a switching power supply device 1 with a small size at low cost.

The switching power supply device 1 may detect the duty ratio DR on the basis of the AC voltage Vac at the center tap CT. Thus, the switching power supply device 1 does not have to be provided with any electrical isolation members, for example, as opposed to a switching power supply device that detects a duty ratio DR on the basis of an AC voltage in a switching circuit 10. Consequently, it is possible to provide the switching power supply device 1 with a simple configuration.

[Effect]

This above embodiment allows for the control the voltage reduction operation on the basis of the output voltage Vout and the duty ratio DR, making it possible to achieve a simple configuration.

[Modification 1]

In the foregoing embodiment, the output voltage Vout is reduced with the output power (=Vout×Iload) kept constant. However, a method of controlling the operation of the switching circuit 10 is not limiting. As an alternative example, various voltage reduction characteristics may be achieved by modifying the LUT 59. More specifically, a voltage reduction characteristic in which the output voltage Vout is reduced with the load current Iload kept constant may be achieved by modifying the LUT 59.

[Modification 2]

In the foregoing embodiment, the LUT 59 is configured using the maximum load current Ilimit, and the operation of the switching circuit 10 is controlled on the basis of the load current Iload and a value (maximum load current Ilimit) obtained from the LUT 59. However, a method of controlling the operation of the switching circuit 10 is not limiting. As an alternative example, the LUT 59 may be configured using a value obtained by converting the maximum load current Ilimit into the input current, and the operation of the switching circuit 10 may be controlled on the basis of the average input current Iindc and a value obtained from the thus-configured LUT 59.

[Modification 3]

Figure 7:
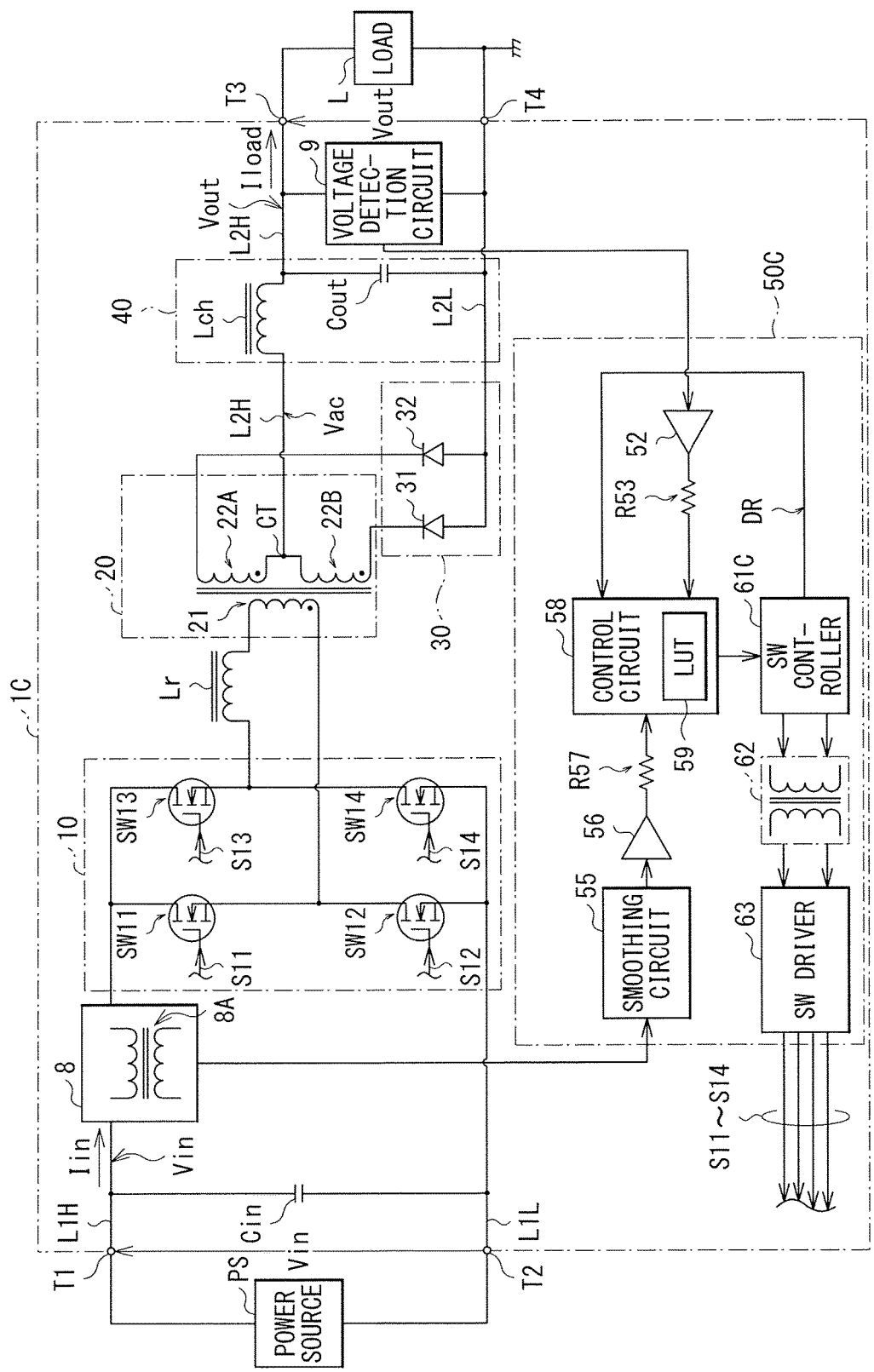
FIG. 7 is a circuit diagram illustrating an example of a configuration of a switching power supply device according to a modification of the embodiment.

In the foregoing embodiment, the switching power supply device 1 is provided with the duty ratio detection circuit 51. However, a configuration of the switching power supply device 1 is not limiting. As an alternative example, the duty ratio detection circuit 51 may be removed as in a switching power supply device 1C illustrated in FIG. 7. The switching power supply device 1C may include a controller 50C. The controller 50C may include an SW controller 61C. The SW controller 61C may control the SW driver 63 on the basis of the control signal supplied from the control circuit 58, similar to the SW controller 61 according to the foregoing embodiment. In addition, the SW controller 61C may have a function of determining the duty ratio DR on the basis of the control signal supplied from the control circuit 58. More specifically, the SW controller 61C may generate the control signal, which is the source of the SW control signals S11 to S14. Thereafter, the SW driver 63 may generate the SW control signals S11 to S14 (see FIG. 3) on the basis of the control signal. This may enable the SW controller 61C to determine the duty ratio DR.

[Modification 4]

In the foregoing embodiment, the rectifier circuit 30 may perform the rectification by using diodes. However, a rectification configuration is not limiting. As an alternative example, the so-called synchronous rectification may be performed. Details of a configuration employing the synchronous rectification will be described below.

Figure 8:
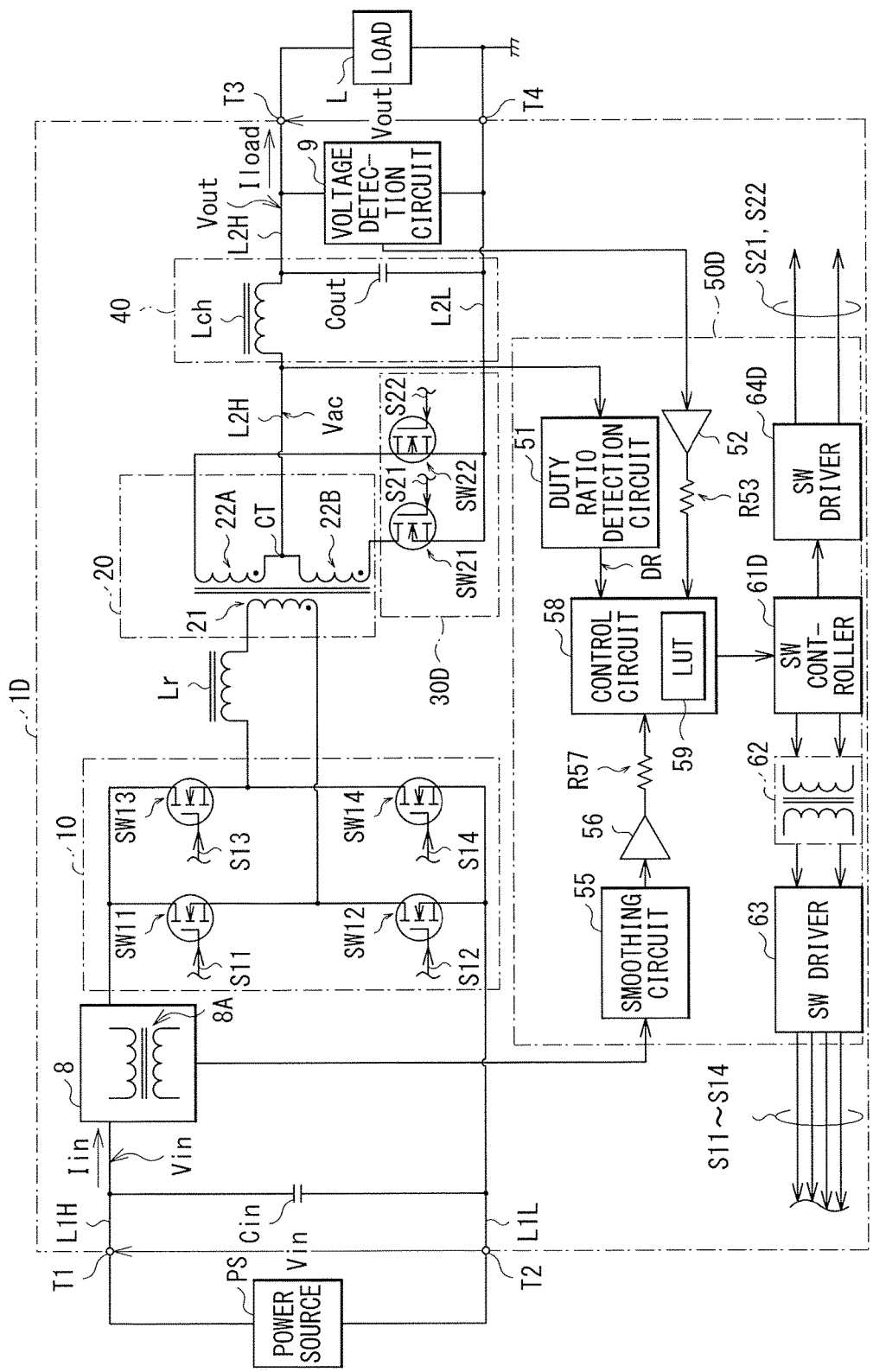
FIG. 8 is a circuit diagram illustrating an example of a configuration of a switching power supply device according to another modification of the embodiment.

FIG. 8 illustrates an example of a configuration of a switching power supply device 1D that performs the synchronous rectification. The switching power supply device 1D may include a rectifier circuit 30D and a controller 50D.

The rectifier circuit 30D may function as a rectifier circuit that rectifies the AC voltage supplied from the transformer 20. The rectifier circuit 30D may include switching elements SW21 and SW22. Each of the switching elements SW21 and SW22 may be, for example, a MOS-FET, an IGBT, or some other power element, similar to the switching elements SW11 to SW14 in the switching circuit 10. In this example, each of the switching elements SW21 and SW22 is an N-channel MOS-FET. A gate of the switching element SW21 may be supplied with an SW control signal S21, which will be described later, a source of the switching element SW21 may be coupled to the secondary low-voltage line L2L, and a drain of the switching element SW21 may be coupled to the first end of the secondary winding 22B in the transformer 20. A gate of the switching element SW22 may be supplied with an SW control signal S22, which will be described later, a source of the switching element SW22 may be coupled to the secondary low-voltage line L2L, and a drain of the switching element SW22 may be coupled to the first end of the secondary winding 22A in the transformer 20.

The controller 50D may include an SW controller 61D and an SW driver 64D. The SW controller 61D may generate the control signal, which is the source of the SW control signals S11 to S14 and thereafter supply the control signal to the SW driver 63 via a transformer 62. In addition, the SW controller 61D may generate a control signal, which is a source of the SW control signals S21 and S22 and thereafter supply the control signal to the SW driver 64D. The SW driver 64D may generate the SW control signals S21 and S22 on the basis of an instruction from the SW controller 61D and thereafter supply the SW control signals S21 and S22 to the switching elements SW21 and SW22, respectively. For example, the SW control signal S21 may be a signal that is at the high level over the periods T12 in FIG. 3 and is at the low level over other periods. For example, the SW control signal S22 may be a signal that is at the high level over the periods T11 in FIG. 3 and is at the low level over other periods.

The above configuration makes it possible to produce achieve effects similar to those of the foregoing embodiment.

Up to this point, the disclosure has been described through some embodiments and modifications. However, the disclosure is not limited to such embodiments and modifications and may be modified in various ways.

In the foregoing embodiment, for example, the switching circuit 10 employs the full-bridge configuration. However, a configuration of the switching circuit 10 is not limiting. As an alternative example, the switching circuit 10 may employ the half-bridge or push-pull configuration.

Moreover, the technology encompasses any possible combination of some or all of the various embodiments and the modification examples described herein and incorporated herein.

It is possible to achieve at least the following configurations from the above-described example embodiments of the technology.

(1) A switching power supply device including:
   a switching power supply circuit that includes a transformer, a switching circuit, and a conversion circuit, the transformer having a primary winding and a secondary winding, the switching circuit being coupled to the primary winding, the conversion circuit being coupled to the secondary winding and converting an alternating current voltage outputted from the secondary winding into a direct current voltage; and
   a control circuit that determines a maximum load current value on a basis of a duty ratio in the conversion circuit and the direct current voltage, and controls, on a basis of the maximum load current value, an operation of the switching circuit to cause the switching power supply circuit to perform a predetermined voltage reduction operation, the maximum load current value indicating a maximum value of a load current that allows the conversion circuit to output a predetermined voltage.

(2) The switching power supply device according to (1), further including a detection circuit that detects the duty ratio on a basis of the alternating current voltage.

(3) The switching power supply device according to (1) or (2), in which the control circuit has a table that indicates a correspondence relationship of the direct current voltage and the duty ratio versus the maximum load current value, and determines the maximum load current value on a basis of the table.

(4) The switching power supply device according to any one of (1) to (3), in which the predetermined voltage reduction operation includes an operation by which a product of the load current and the direct current voltage becomes constant.

(5) The switching power supply device according to any one of (1) to (4), in which the control circuit determines the load current on a basis of an input current supplied to the switching circuit, and controls the operation of the switching circuit to cause the switching power supply circuit to perform the predetermined voltage reduction operation when a current value of the load current is equal to or more than the maximum load current value.

(6) The switching power supply device according to any one of (1) to (4), in which the control circuit controls the operation of the switching circuit to cause the switching power supply circuit to perform the predetermined voltage reduction operation when a current value of an input current supplied to the switching circuit is equal to or more than a maximum input current value that is related to the maximum load current value.

(7) A switching control circuit including
   circuitry that
      determines a maximum load current value on a basis of a duty ratio in a conversion circuit provided in a switching power supply circuit and a direct current voltage into which the conversion circuit converts an alternating current voltage, the maximum load current value indicating a maximum value of a load current that allows the conversion circuit to output a predetermined voltage, and
      controls, on a basis of the maximum load current value, an operation of the switching power supply circuit to cause the switching power supply circuit to perform a predetermined voltage reduction operation.

The switching power supply device and the switching control circuit according to the embodiment of the disclosure determine the maximum load current on the basis of the direct current voltage and the duty ratio in the conversion circuit, and control the operation of the switching circuit on the basis of the maximum load current value. This makes it possible to provide the switching power supply device and the switching control circuit with simple configurations.

Although the technology has been described in terms of exemplary embodiments, it is not limited thereto. It should be appreciated that variations may be made in the described embodiments by persons skilled in the art without departing from the scope of the technology as defined by the following claims. The limitations in the claims are to be interpreted broadly based on the language employed in the claims and not limited to examples described in this specification or during the prosecution of the application, and the examples are to be construed as non-exclusive. For example, in this disclosure, the term "preferably", "preferred" or the like is non-exclusive and means "preferably", but not limited to. The use of the terms first, second, etc. do not denote any order or importance, but rather the terms first, second, etc. are used to distinguish one element from another. The term "substantially" and its variations are defined as being largely but not necessarily wholly what is specified as understood by one of ordinary skill in the art. The term "about" or "approximately" as used herein can allow for a degree of variability in a value or range. Moreover, no element or component in this disclosure is intended to be dedicated to the public regardless of whether the element or component is explicitly recited in the following claims.

What is claimed is:

1. A switching power supply device comprising:
    a switching power supply circuit that includes a transformer, a switching circuit, and a conversion circuit, the transformer having a primary winding and a secondary winding, the switching circuit being coupled to the primary winding, the conversion circuit being coupled to the secondary winding and converting an alternating current voltage outputted from the secondary winding into a direct current voltage; and
    a control circuit that determines a maximum load current value on a basis of a duty ratio in the conversion circuit and the direct current voltage, and controls, on a basis of the maximum load current value, an operation of the switching circuit to cause the switching power supply circuit to perform a predetermined voltage reduction operation, the maximum load current value indicating a maximum value of a load current that allows the conversion circuit to output a predetermined voltage.

2. The switching power supply device according to claim 1, further comprising a detection circuit that detects the duty ratio on a basis of the alternating current voltage.

3. The switching power supply device according to claim 1, wherein the control circuit has a table that indicates a correspondence relationship of the direct current voltage and the duty ratio versus the maximum load current value, and determines the maximum load current value on a basis of the table.

4. The switching power supply device according to claim 1, wherein the predetermined voltage reduction operation comprises an operation by which a product of the load current and the direct current voltage becomes constant.

5. The switching power supply device according to claim 1, wherein the control circuit determines the load current on a basis of an input current supplied to the switching circuit, and controls the operation of the switching circuit to cause the switching power supply circuit to perform the predetermined voltage reduction operation when a current value of the load current is equal to or more than the maximum load current value.

6. The switching power supply device according to claim 1, wherein the control circuit controls the operation of the switching circuit to cause the switching power supply circuit to perform the predetermined voltage reduction operation when a current value of an input current supplied to the switching circuit is equal to or more than a maximum input current value that is related to the maximum load current value.

7. A switching control circuit comprising
    circuitry that:
    determines a maximum load current value on a basis of a duty ratio in a conversion circuit provided in a switching power supply circuit and a direct current voltage into which the conversion circuit converts an alternating current voltage, the maximum load current value indicating a maximum value of a load current that allows the conversion circuit to output a predetermined voltage; and
    controls, on a basis of the maximum load current value, an operation of the switching power supply circuit to cause the switching power supply circuit to perform a predetermined voltage reduction operation.

* * * * *